(12) United States Patent
Nimura

(10) Patent No.: US 6,194,025 B1
(45) Date of Patent: Feb. 27, 2001

(54) METHOD FOR MANUFACTURING MAGNETIC RECORDING MEDIUM

(75) Inventor: Kazuo Nimura, Nagano (JP)

(73) Assignee: Fuji Electric Co., Ltd. (JP)

( * ) Notice: Subject to any disclaimer, the term of this patent is extended or adjusted under 35 U.S.C. 154(b) by 0 days.

(21) Appl. No.: 09/493,867

(22) Filed: Jan. 28, 2000

(30) Foreign Application Priority Data

Feb. 23, 1999 (JP) .................................................. 11-045520

(51) Int. Cl.$^7$ ....................................................... B05D 5/12
(52) U.S. Cl. ..................... 427/131; 427/132; 427/385.5; 427/407.1; 427/430.1
(58) Field of Search ..................................... 427/131, 132, 427/385.5, 407.1, 430.1; 428/694 TP, 694 TC, 694 B, 695, 900

(56) References Cited

FOREIGN PATENT DOCUMENTS

| 360038719 | * | 2/1985 | (JP) . |
| 3-80430 | * | 4/1991 | (JP) . |

* cited by examiner

*Primary Examiner*—Bernard Pianalto
(74) *Attorney, Agent, or Firm*—Morrison Law Firm

(57) ABSTRACT

A lubricant film is formed on the surface of a substrate of a magnetic recording medium. The substrate consists of a non-magnetic base layer, a magnetic layer and a protective film, in that order. The substrate is immersed in a lubricant solution in a sealed container. The sealed container is pressurized with an inert gas introduced in the sealed container. The lubricant solution is then discharged, thereby forming a lubricant film on the surface of the protective film. Lubricant film thickness is varied by controlling a discharge rate, either by controlling the gas pressure, or the outflow rate of the lubricant solution.

6 Claims, 1 Drawing Sheet

METHOD FOR MANUFACTURING MAGNETIC RECORDING MEDIUM

BACKGROUND OF THE INVENTION

The present invention relates to a method for manufacturing a magnetic recording medium mounted in magnetic storage devices used in data storage devices of data processing devices such as computers. More specifically, the present invention relates to a method for forming a lubricating film disposed on a protective film of the magnetic recording medium.

Generally, magnetic storage devices (hard disk drives) (hereinafter also referred to as device) include a magnetic recording medium (magnetic disk medium) (hereinafter also referred to as medium) rotatable at high speeds, and a magnetic head facing the medium. Data are written to the medium and data recorded on the medium are read by having the magnetic head fly slightly above the medium rotating at high speeds due to the air currents generated by the rotation of the medium. The data recording density of the medium is greater when the distance between the magnetic layer of the medium and the magnetic head (the magnetic head flight) is small. Devices generally use the CSS (Contact Start Stop) system. When the device is inactive, the magnetic head is resting on the static medium surface. When the device is starting up or is stopping, the magnetic head temporarily makes sliding contact with the medium that is spinning up or spinning down. To allow the sliding contact to be smooth when this happens, a lubricant film is generally disposed on the medium surface.

Conventionally, the lubricant film for this type of medium is formed using methods such as: dipping, where a non-magnetic substrate formed with everything up to a protective film (hereinafter referred to as substrate with protective film) is immersed in a container of lubricant solution and then pulled up; spin-coating, where a lubricant solution is dripped to the surface of the protective film on a rotating substrate with protective film; and fluid drainage, where a substrate with protective film is immersed in a lubricant solution, and then the lubricant solution is allowed to flow out from the bottom of the container with the help of gravity.

The lubricant film of the medium is important for maintaining the reliability of the magnetic storage device since it provides smoothness during the temporary sliding contact between the surface of the medium and the magnetic head when the device is being started or stopped. In particular, there has been a growing demand for increased storage capacity in devices, and there is a need to keep the magnetic head flight small when the device is operating. Thus, film thickness of the lubricant film and variations in the film thickness must be kept within the order of angstroms. As a result, surrounding air currents during formation of the lubricant film must be eliminated and vibration from support mechanisms, drive mechanisms and the like for the substrate with protective film must be eliminated. Also, contamination of the lubricant solution from organic gas, inorganic gas, and particles present in the film-forming atmosphere must be prevented. Furthermore, transpiration of solvent from the lubricant solution can result in changes in the concentration of the lubricant solution, resulting in changes in the thickness of the lubricant film being formed. For this reason, transpiration of the solvent must be prevented. Furthermore, when fluorine-based solvents are used as the solvent in the lubricant solution, environmental considerations require that transpiration of the solvent vapor to the atmosphere must be reduced as much as possible.

OBJECTS AND SUMMARY OF THE INVENTION

The object of the present invention is to overcome the problems described above and to provide a method for forming a homogeneous lubricant film with minimal variation in thickness on a protective film surface of a substrate with protective film.

To achieve these objects, the present invention provides a method for manufacturing a magnetic recording medium wherein a non-magnetic base layer, a magnetic layer, a protective film, and a lubricant film are formed in sequence on a non-magnetic substrate. A substrate with protective film is immersed in a lubricant solution in a sealed container. The lubricant solution can be either a mixture of liquid lubricant and a solvent or a lubricant solution and a liquid lubricant and an additive (a material to prevent degeneration of the lubricant, a material to improve lubrication, or the like). Then, an inert gas is introduced into the sealed container to increase the pressure within the sealed container. The lubricant solution is discharged to form a lubricant film.

Once immersed in the lubricant, the substrate with protective film stays static while the film is formed. Thus, there is no vibration from a support mechanism, a drive mechanism, or the like for the substrate with protective film. Since film formation takes place in the sealed container, there is no transpiration of solvent from the lubricant solution and there is no change in concentration of the lubricant solution. Also, various forms of contamination are avoided. Since an appropriate gas pressure is used to push out and discharge the lubricant solution, it is possible to eliminate the variations in the thickness of the film caused, for example, by the conventional fluid drainage method, where the discharge volume changes so that the thickness of the lubricant film varies.

Briefly stated, the present invention provides a lubricant film formed on the surface of a substrate of a magnetic recording medium. The substrate consists of a non-magnetic base layer, a magnetic layer and a protective film, in that order. The substrate is immersed in a lubricant solution in a sealed container. The sealed container is pressurized with an inert gas introduced in the sealed container. The lubricant solution is then discharged, thereby forming a lubricant film on the surface of the protective film. Lubricant film thickness is varied by controlling a discharge rate, either by controlling the gas pressure, or the outflow rate of the lubricant solution.

According to an embodiment of the invention, there is provided a method for forming a lubricant film on a magnetic recording substrate, said substrate being of a type including a non-magnetic base layer, a magnetic layer, and a protective film in this named sequence, comprising: immersing said substrate in a lubricant solution in a sealed container which includes a liquid lubricant and a solvent, pressurizing said sealed container by introducing an inert gas in said sealed container, and discharging said lubricant solution for forming said lubricant film.

According to a feature of the invention, there is provided a method for forming a lubricant film on a magnetic recording substrate, said substrate being of a type including a non-magnetic base layer, a magnetic layer, and a protective film in this named sequence, comprising: immersing said substrate in a lubricant solution in a sealed container which includes a liquid lubricant, an additive and a solvent, pressurizing said sealed container by introducing an inert gas in said sealed container, and discharging said lubricant solution for forming said lubricant film.

According to a further feature of the invention, there is provided a magnetic recording medium made by the method of either of the two preceding paragraphs.

The above, and other objects, features and advantages of the present invention will become apparent from the following description read in conjunction with the accompanying drawings, in which like reference numerals designate the same elements.

BRIEF DESCRIPTION OF THE DRAWINGS

The FIGURE is a drawing to which reference will be made in describing an example of a pressurized lubricant application device according to the present invention.

DETAILED DESCRIPTION OF THE PREFERRED EMBODIMENTS

Figure 1:
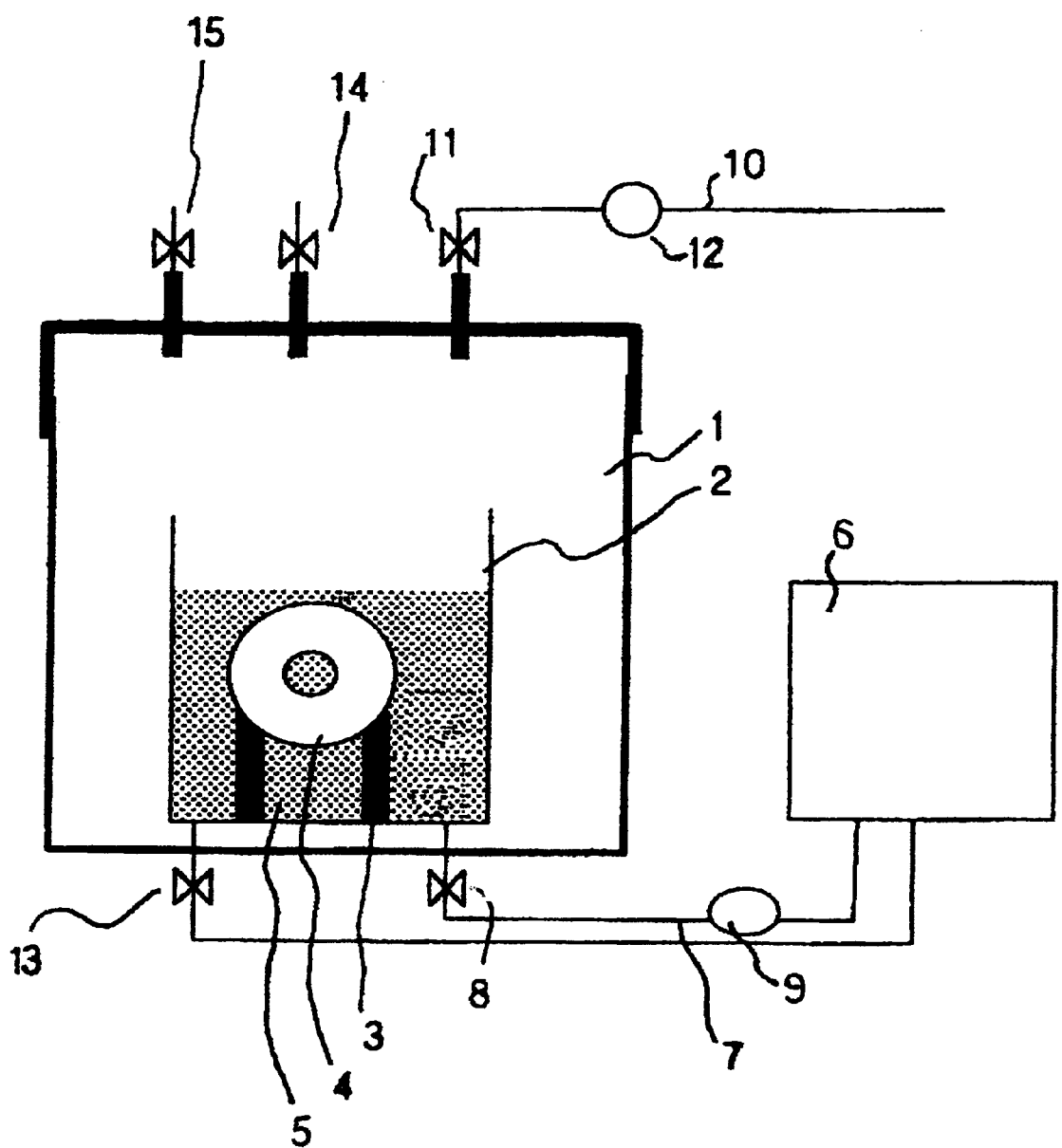

Referring to the FIGURE, a pressurized lubricant application device according to the present invention permits a disk-shaped substrate with protective film 4 to be set on a support base 3 installed in an application tank 2 inside a pressurized container 1. The pressurized container 1 is sealable and can be opened and closed. The substrate with protective film 4 is set so that the surface of the substrate is vertical. The cover of the pressurized container 1 is closed. A supply valve 8 is opened to introduce a lubricant solution into the application tank 2 from a solution tank 6. The introduction is performed with a pump 9, but it would also be possible to use other known methods such as gas pressure. The lubricant solution 5 is injected until the entire substrate with protective film 4 is immersed. Then the supply valve 8 is closed. Next, a gas supply valve 11 is opened and an inert gas is introduced into the pressurized container 1 via a gas tube 10. The gas used here can be nitrogen, air, or the like that has had contaminants removed through filtration. There is also shown a gas pressure gauge 12. The gas pressure depends on the size of the container, but can be, for example, approximately 0.2 mPa. Next, a discharge valve 13 is opened and the lubricant solution 5 is circulated back to the solution tank 6 from the application tank 2. The gas pressure in the pressurized container 1 is adjusted to control the discharge rate, or the setting of the discharge valve 13 is adjusted to adjust the discharge volume for the lubricant solution and to adjust the discharge rate. This adjusts the rate at which the surface of the substrate with protective film emerges from the lubricant solution, thereby allowing control over the thickness of the lubricant film applied to the substrate with the protective film. A safety valve 15 limits the pressure in the pressurized container 1.

The lubricant solution can be either a mixture of liquid lubricant and a solvent or such a mixture with the addition of a material to prevent degeneration of the lubricant or a material to improve lubrication (e.g., an antioxidant or an extreme-pressure additive such as phosphazene). It would be desirable to use a known perfluoropolyether-based lubricant as the liquid lubricant, but the present invention is not restricted to this.

The present invention provides a method for manufacturing a magnetic recording medium in which a non-magnetic base layer, a magnetic layer, a protective film, and a lubricant film are formed in sequence on a non-magnetic substrate. In the present invention, the substrate with protective film is immersed in a lubricant solution in a sealed container. The lubricant solution is formed from either a liquid lubricant and a solvent or from a liquid lubricant, an additive, and a solvent. Then, an inert gas is introduced into the sealed container to pressurize the sealed container. The lubricant solution is discharged and a lubricant film is formed. As a result, a homogeneous lubricant film with minimal variation in thickness is formed on the surface of the substrate with protective film. This allows a high reliable medium to be manufactured.

The thickness of the lubricant film that is formed can be controlled by adjusting the pressure within the sealed container to adjust the rate at which the lubricant solution is discharged. Alternatively, the thickness of the lubricant film can be controlled by adjusting the volume of lubricant solution discharged from the sealed container to adjust the rate at which the solution is discharged.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed:

1. A method for forming a lubricant film on a magnetic recording device, said magnetic recording device including a non-magnetic substrate, a magnetic layer, and a protective film in this named sequence, comprising:

immersing said magetic recording device in a lubricant solution in a sealed container which includes a liquid lubricant and a solvent;

pressurizing said sealed container by introducing an inert gas in said sealed container; and discharging said lubricant solution for forming said lubricant film.

2. A method for manufacturing a magnetic recording medium according to claim 1 wherein the step of immersing includes controlling a thickness of said lubricant film by controlling a pressure in said container to thereby control a discharge rate of said lubricant solution during the step of discharging.

3. A method for manufacturing a magnetic recording medium according to claim 1 wherein the step discharging includes controlling a thickness of said lubricant film by controlling a discharge volume of said lubricant solution from said pressurized container by varying a discharge rate of said lubricant solution.

4. A method for forming a lubricant film on a magnetic recording device, said magnetic recording device including a non-magnetic substate, a magnetic layer, and a protective film in this named sequence, comprising:

immersing said magnetic recording device in a lubricant solution in a sealed container which includes a liquid lubricant, an additive and a solvent;

pressurizing said sealed container by introducing an inert gas in said sealed container; and discharging said lubricant solution for forming said lubricant film.

5. A method for manufacturing a magnetic recording medium according to claim 4 wherein the step of immersing includes controlling a thickness of said lubricant film by controlling a pressure in said container to thereby control a discharge rate of said lubricant solution during the step of discharging.

6. A method for manufacturing a magnetic recording medium according to claim 4 wherein the step discharging includes controlling a thickness of said lubricant film by controlling a discharge volume of said lubricant solution from said pressurized container by varying a discharge rate of said lubricant solution.

* * * * *